United States Patent [19]
Ishida

[11] Patent Number: 5,110,199
[45] Date of Patent: May 5, 1992

[54] DISTORTION FREE OPHTHALMIC LENS FOR PRESBYOPIA HAVING WIDE RANGE DISTINCT VIEWS

[76] Inventor: Takeshi Ishida, 289 Bessho-cho, Matsubara-shi, Osaka, Japan

[21] Appl. No.: 649,420

[22] Filed: Feb. 1, 1991

[51] Int. Cl.⁵ .............................................. G02C 7/06
[52] U.S. Cl. .................................................... 351/169
[58] Field of Search .................. 351/159, 168–172; 350/413; 359/652

[56] References Cited

U.S. PATENT DOCUMENTS

| | | | |
|---|---|---|---|
| 3,486,808 | 12/1969 | Hamblen | 350/413 |
| 3,687,528 | 8/1972 | Maitenaz | 351/169 |
| 3,910,691 | 10/1975 | Maitenaz | 351/169 |
| 4,856,889 | 8/1989 | Guilino et al. | 350/413 X |

Primary Examiner—Scott J. Sugarman
Attorney, Agent, or Firm—Moonray Kojima

[57] ABSTRACT

This invention relates to a lens for presbyopia free from distortional aberration for use in correcting an old-age eyesight. In the lens for presbyopia with a front lens surface having a smaller radius of curvature than a rear lens face, a lens surface has a refractive power successively corrected as the lens surface extends radially outwardly away from a geometric center of the lens so that lateral magnifications for all principal rays always equal a lateral magnification for a paraxial range. This construction is entirely free from distortional aberration, and secures a greatly enlarged range of distinct vision.

1 Claim, 4 Drawing Sheets

DISTORTION FREE OPHTHALMIC LENS FOR PRESBYOPIA HAVING WIDE RANGE DISTINCT VIEWS

SUMMARY OF THE INVENTION

This invention relates to an ophthalmic lens for presbyopia free from distortion for use in correcting an old-age eyesight. In the lens for presbyopia with a front lens surface having a smaller radius of curvature than a rear lens surface, a refractive power is corrected successively as the lens surface extends radially outwardly away from a geometric center of the lens so that lateral magnifications for all principal rays are always equal to a lateral magnification for a paraxial range. This construction is entirely free from distortion, and secures a greatly enlarged range of distinct vision.

BACKGROUND OF THE INVENTION

When adjustment power of the crystalline lens becomes weak in presbyopia, accommodation for seeing a close object becomes impossible. In this case, generally, spectacles having convex lenses may be used to compensate for the adjusting power.

An example of known convex lenses for presbyopia is shown in FIG. 5. This is a lens 50 for presbyopia with a front surface 50F having a radius of curvature r(1) smaller than a radius of curvature r(2) of a rear surface 50R thereof.

Specifically, take a lens of 2D for example, where the smaller radius of curvature r(1) is set to 116.754 mm, and the larger radius of curvature r(2) to 218.667 mm.

In the illustrated spherical lens for presbyopia, usually the ratio of size (lateral magnification) between an object and a virtual image seen through the lens 50 varies with the height of the object. That is distortional aberration. This phenomenon is the more salient the higher is the diopter of the lens.

In addition, as shown in hatching in FIG. 5, the conventional lens 50 provides a range of distinct vision. When, for example, the user or patient wears lenses of 2D, a corrected near point on an optical axis a is at a distance of 300 mm (which is a distance from the front surface of the cornea in an eyeball 52), and a corrected far point is at a distance of 504 mm (the focal length of the lens) assuming that the far point is at infinity for the naked eye of the user. The range of distinct vision exists between the near point at 300 mm and the far point at 504 mm for all looking directions of the eye. In FIG. 5, the angle 01 or 02 forms 30 degrees with the optical axis a. The range of distinct vision becomes small when the diopter of the lens becomes large.

Thus, when the conventional spherical lens 50 is used, the range of distinct vision is limited to narrow regions, and an image becomes deformed by the distortional aberration. This results in the disadvantages of the eyes becoming fatigued after a long period of use in the absence of a comfortable visual sense.

OBJECTS OF THE INVENTION

A principal object of this invention is to provide a lens for presbyopia free from distortional aberration and realize a greatly increased region of distinct vision.

Another object of this invention is realize a comfortable visual sense with little fatigue of the eye after a long period of use and to provide a distinct vision for short and intermediate distances.

Other objects of this invention will be apparent from the following description of the preferred embodiment.

BRIEF DESCRIPTION OF THE DRAWINGS

The drawings show an embodiment of this invention, in which.

DESCRIPTION OF THE PREFERRED EMBODIMENT

A lens with a front surface having a corrected refractive power will be described in detail as an embodiment of this invention with reference to the drawings.

Figure 1:
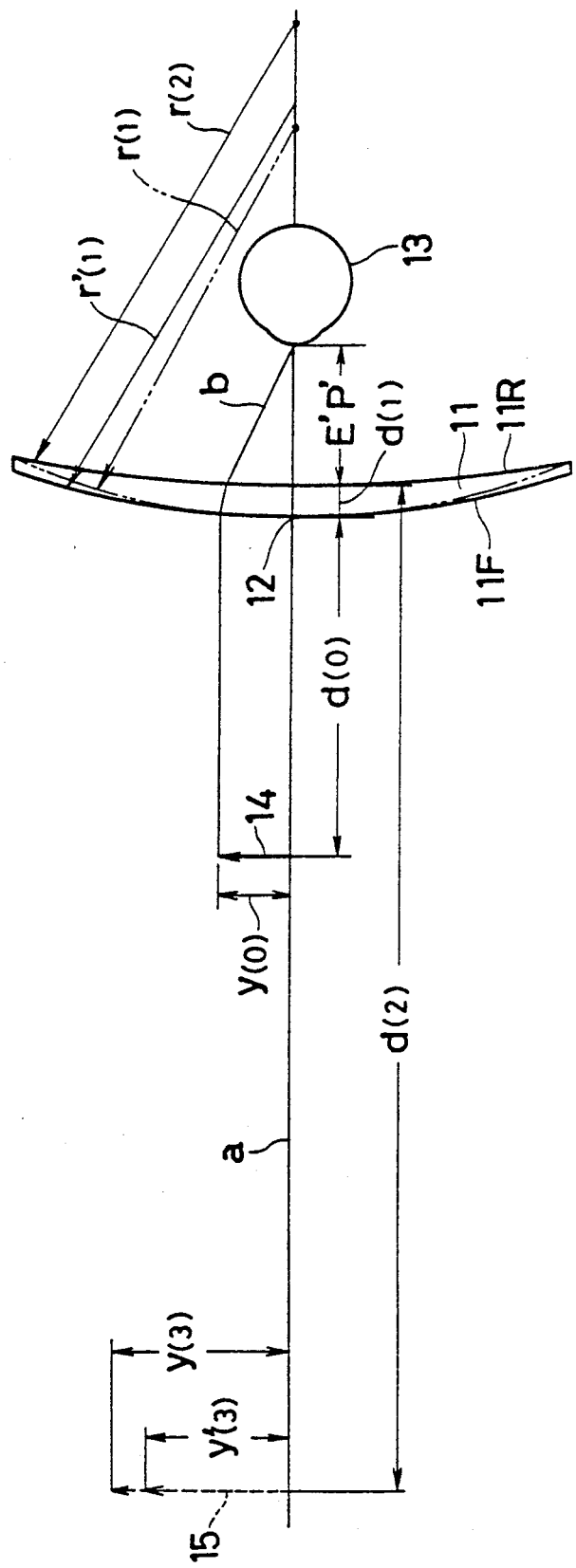
FIG. 1 is an explanatory view of a lens for presbyopia free from distortion according to this invention.

The drawings show a lens for presbyopia free from distortional aberration. In FIG. 1, a lens 11 for presbyopia defines a front surface 11F having a radius of curvature smaller than a radius of curvature r(2) of a rear surface 11R thereof. The radius of curvature r'(1) of the front surface 11F of the lens 11 is successively corrected as the front face extends radially outwardly away from a geometric center of the lens 11, so that the radius of curvature r'(1) progressively increases to have a lateral magnification for all principal rays equaling a lateral magnification for a paraxial range.

Figure 2:
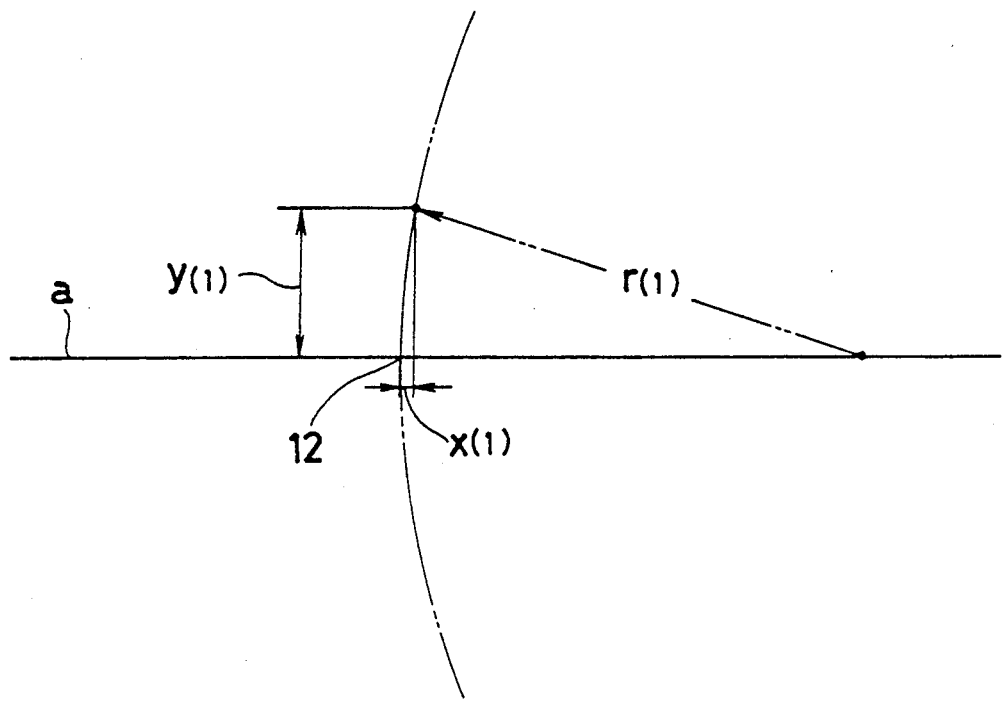
FIG. 2 is an explanatory view showing a state of a front surface of the lens before a correction.
Figure 3:
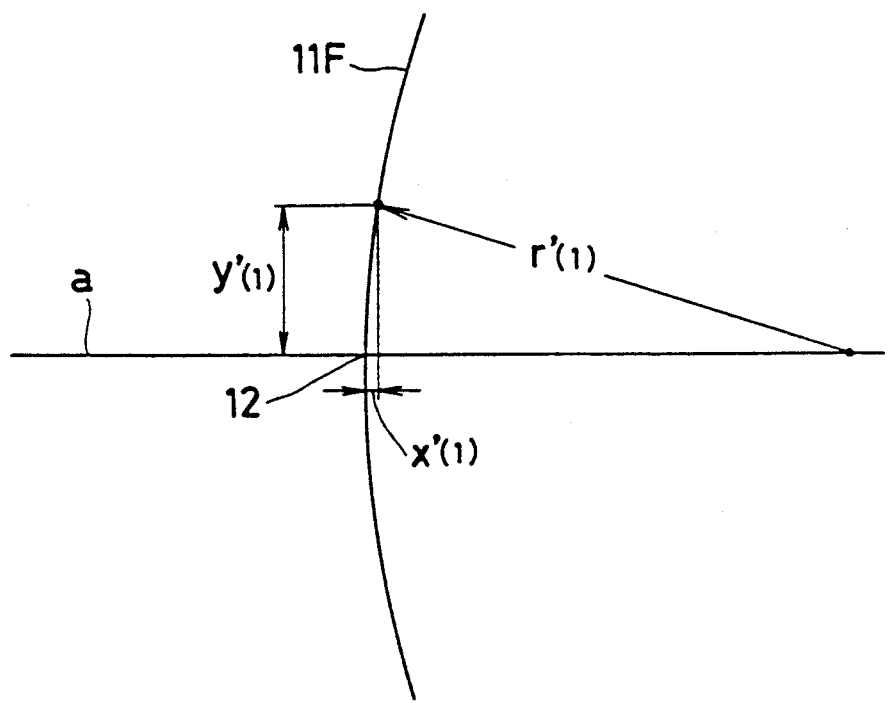
FIG. 3 is an explanatory view showing a state of the front surface of the lens after the correction.

FIGS. 1 and 2 show a radius of curvature r(1) prior to the correction in phantom lines. FIGS. 1 and 3 show the radius of curvature r'(1) after the correction in solid lines. The radius of curvature r(1) is corrected such that the radius of curvature r'(1) is progressively greater than the radius of curvature r(1) as the front surface 11F of the lens 11 extends radially outwardly away from the geometric center 12 of the lens.

A specific construction of the lens 11 for presbyopia will be described hereinafter, taking a lens of 2D, for example.

When the lens 11 is used as shown in FIG. 1, a distance E'P' on an optical axis a between the front surface of an eyeball 13 and the rear surface R11 of the lens 11 is set to 18 mm, the lens 11 has a thickness d(1) on the optical axis a set to 3 mm, a distance d(0) on the optical axis a between the front surface F11 of the lens 11 and an object 14 is 300 mm, the radius of curvature r(2) of the rear face 11R of the lens 11 is 218.667 mm, and the radius of curvature r(1) of the front face F11 of the lens 11 is 116.754 mm. A lateral magnification $\beta$ for a paraxial range is 2.44136 which is derived from the refractive index of air N'(0) which is 1 and the refractive index N'(1) of the lens 11 formed of a transparent acrylic resin which is 1.492. A distance on the optical axis a between the rear surface 11R of the lens 11 and a virtual image 15 is $-731.11$ mm.

Next, when the height y(0) of the object 14 is 10 mm, the radius of curvature r'(1) of the front face 11F which is 116.754 mm is corrected to be 116.853996276855 mm so that the virtual image 15 has a height y'(3) equaling the above lateral magnification $\beta$, whereby the virtual image 15 having a height y(3) prior to the correction is changed to the height y'(3) which is 24.413 mm. Then, the lateral magnification is y'(3)/y(0) = 2.44134.

That is, the radius of curvature of the front surface F11 of the lens 11 is increased from r(1) to r'(1) so that an x-coordinate x(1) and a Y-coordinate y(1) of an intersecting point between a principal ray and the uncorrected surface as shown in FIG. 2 are corrected to be an X-coordinate x'(1) and a Y-coordinate y'(1) of the intersecting point between the principal ray and the corrected surface.

Next, when the height y(0) of the object 14 is 20 mm, the radius of curvature r'(1) of the front surface 11F is corrected to be 116.9539947509766 mm so that the virtual image 15 has a height y'(3) equaling the above lateral magnification β, whereby the virtual image 15 having the height y(3) prior to the correction is changed to a height y'(3) which is 48.44166 mm. Then, the lateral magnification β is y'(3)/y(0) = 2.44166.

Next, when the height y(0) of the object 14 is 30 mm, the radius of curvature r'(1) of the front surface 11F is corrected to be 117.453987121582 mm so that the virtual image 15 has a height y'(3) equaling the above lateral magnification β, whereby the virtual image 15 having the height y(3) prior to the correction is changed to a height y'(3) which is 73.24796 mm. Then, the lateral magnification β is y'(3)/y(0) = 2.4416.

Thereafter, the height y(0) of the object 14 is successively increased 10 mm, and the radius of curvature r'(1) of the front face 11F is increased as above until y(0) equals 170 mm. Only numeric values will be set out for expediency of explanation.

When y(0) is 40 mm,
r'(1) = 118.1539764404297 mm,
y'(3) = 97.6602 mm; and
β = 2.4415.
When y(0) is 50 mm,
r'(1) = 118.9539642333984 mm,
y'(3) = 122.077 mm, and
β = 2.44154.
When y(0) is 60 mm,
r'(1) = 120.0539474487305 mm,
y'(3) = 146.481 mm, and
β = 2.44136.
When y(0) is 70 mm,
r'(1) = 121.1539306640625 mm,
y'(3) = 170.903 mm, and
β = 2.44147.
When y(0) is 80 mm,
r'(1) = 122.5539093017578 mm,
y'(3) = 195.306 mm, and
β = 2.44133.
When y(0) is 90 mm,
r'(1) = 123.9538879394531 mm,
y'(3) = 219.731 mm, and
β = 2.44145.
When y(0) is 100 mm,
r'(1) = 125.6538619995117 mm,
y'(3) = 244.129 mm, and
β = 2.44129.
When y(0) is 110 mm,
r'(1) = 127.3538360595703 mm,
y'(3) = 268.551 mm, and
β = 2.44137.
When y(0) is 120 mm,
r'(1) = 129.25390625 mm,
y'(3) = 292.957 mm, and
β = 2.44131.
When y(0) is 130 mm,
r'(1) = 131.1540222167969 mm,
y'(3) = 317.386 mm, and
β = 2.44143.
When y(0) is 140 mm,
r'(1) = 133.254150390325 mm,
y'(3) = 341.793 mm, and
β = 2.44138.
When y(0) is 150 mm,
r'(1) = 135.4542846679687 mm,
y'(3) = 366.194 mm, and
β = 2.4413.
When y(0) is 160 mm,
r'(1) = 137.6544189453125 mm,
y'(3) = 390.615 mm, and
β = 2.44134.
When y(0) is 170 mm,
r'(1) = 139.9545593261719 mm,
y'(3) = 415.024 mm, and
β = 2.44132.

In this way, the radius of curvature r'(1) of the front surface F11 of the lens 11 is successively increased so that the lateral magnifications for all the principal rays equal the lateral magnification β for the paraxial range. Since the front surface F11 of the lens has a unique, aspherical structure, the distortional aberration is completely eliminated to produce the effect of realizing a lens free from aberration.

Figure 4:
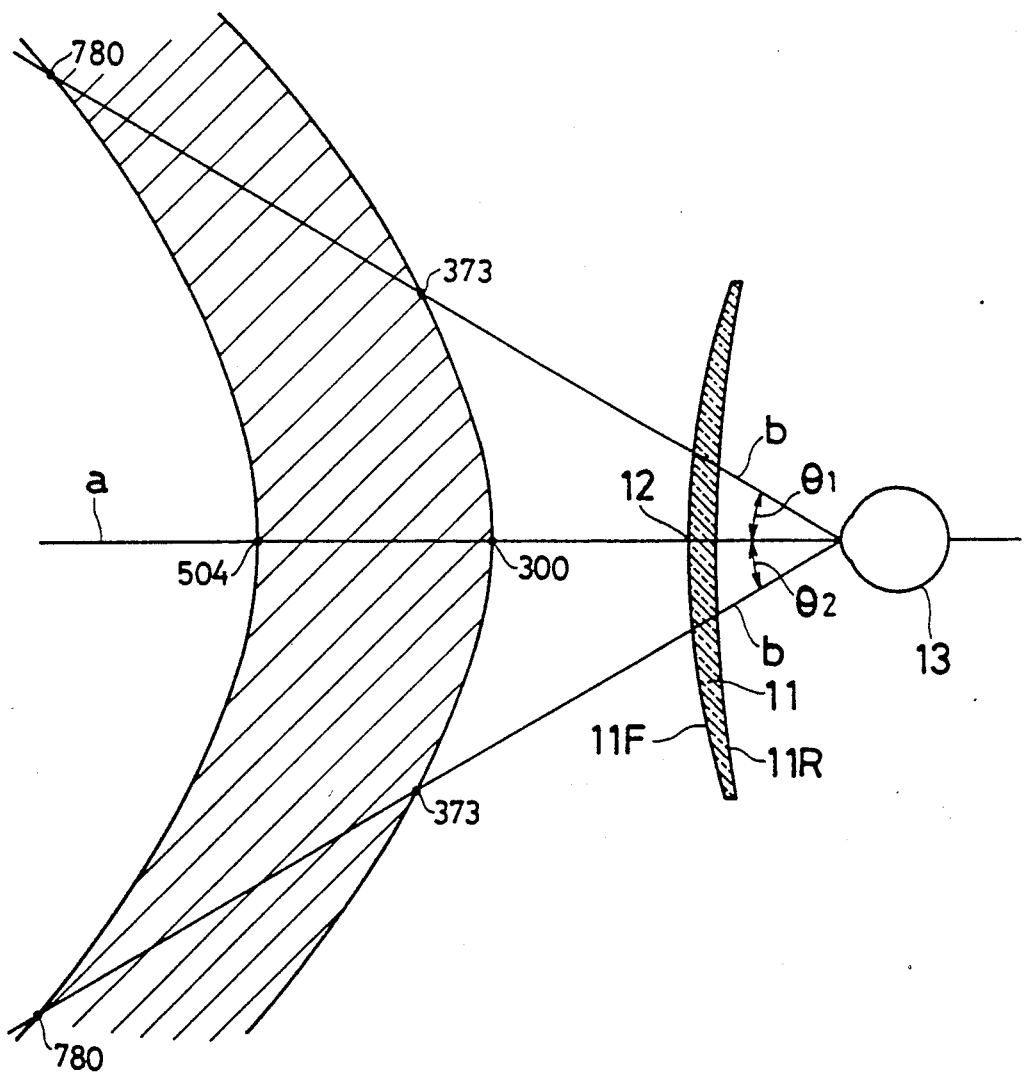
FIG. 4 is an explanatory view showing a range of distinct vision of the lens according to this invention.
Figure 5:
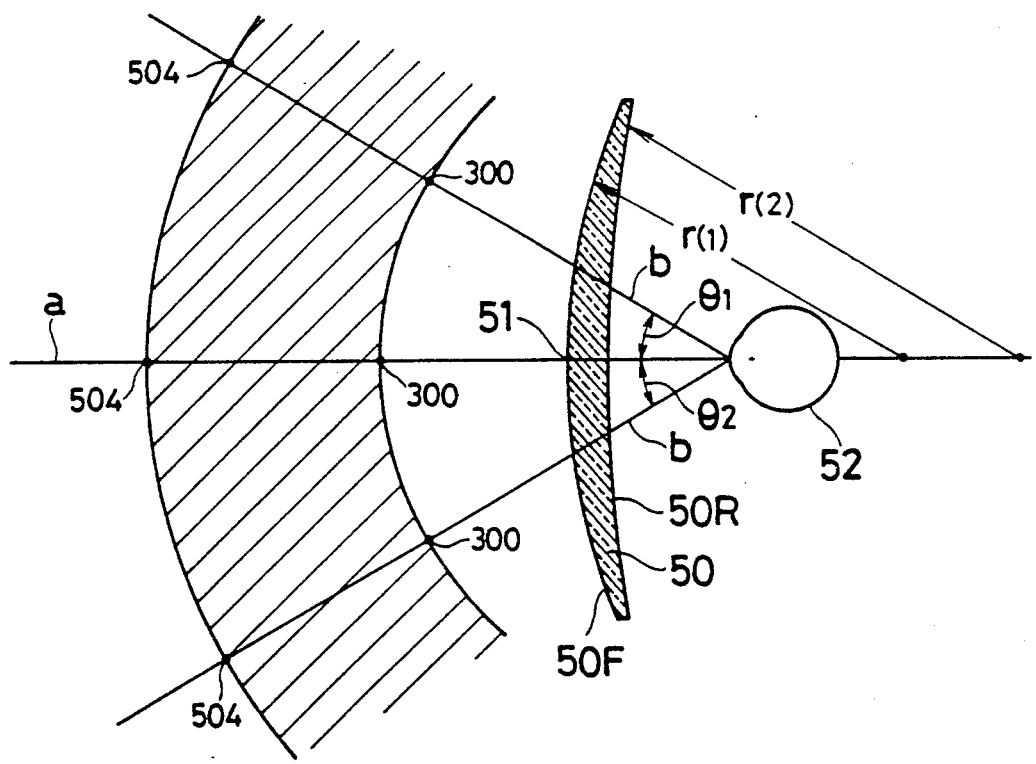
FIG. 5 is an explanatory view showing a range of distinct vision of a conventional lens.

In addition, a greatly increased range of distinct vision is secured as shown in hatching in FIG. 4. Take the lens 11 of 2D, for example, the near point on the optical axis a is at 300 mm and the far point at 504 mm. In a state in which principal rays b form an angle 01 or 02 of 30 degrees with the optical axis a, the range of distinct vision is greatly increased with the near point at about 373 mm and the far point at about 780 mm. This effect is the more salient the higher is the diopter of the lens.

Thus, when the lens 11 of the above construction is used, there occurs no fluctuation of the image due to movement of the eyeball, and a clear field of view is secured covering from a short distance range to an intermediate distance range. Thus, a comfortable visual sense is secured and the fatigue of the eye resulting from a long period of use is reduced.

Further, since, as described above, the radius of curvature of the front surface F11 of the lens 11 is successively increased (i.e. the refractive power of the lens is successively reduced), the front surface F11 becomes aspherical and projects only a small amount compared with a spherical surface, i.e. has a small swell. The lens can be made thin by the corresponding amount, which produces the effects of securing a brighter field of view and allowing the lens 11 to be lightweight.

In the foregoing embodiment, the radius of curvature of the front surface of the lens is successively increased to successively decrease the refractive power of the lens. The correction is not limited to the front surface of the lens, but may of course be effected to the rear surface only or to both the front and rear surfaces.

What is claimed is:

1. In a lens for presbyopia comprising a front surface and a near surface, said front surface having a radius of curvature which is smaller than the radius of curvature of said rear surface, the improvement comprising
   one of said front and rear surfaces having a radius of curvature which is successively increased as the lens surface extends radially outwardly away from the geometric center of the lens in such a manner that lateral magnifications for principal rays transmitted through the lens in a non-paraxial range are substantially the same as the lateral magnification for a principal ray transmitted through the lens in a paraxial range, whereby aberrational distortion of the lens is substantially eliminated and the range of distinct vision through the lens is substantially extended.

* * * * *